(12) United States Patent
Das

(10) Patent No.: US 8,876,992 B2
(45) Date of Patent: Nov. 4, 2014

(54) PROCESS AND SYSTEM FOR FABRICATING GAMMA TIAL TURBINE ENGINE COMPONENTS

(75) Inventor: Gopal Das, Simsbury, CT (US)

(73) Assignee: United Technologies Corporation, Hartford, CT (US)

( * ) Notice: Subject to any disclaimer, the term of this patent is extended or adjusted under 35 U.S.C. 154(b) by 0 days.

(21) Appl. No.: 12/870,909

(22) Filed: Aug. 30, 2010

(65) Prior Publication Data

US 2012/0048430 A1 Mar. 1, 2012

(51) Int. Cl.
| | |
|---|---|
| *C22F 1/18* | (2006.01) |
| *B21J 1/00* | (2006.01) |
| *B21J 1/02* | (2006.01) |
| *B21J 1/06* | (2006.01) |
| *B21J 5/00* | (2006.01) |
| *B21K 3/04* | (2006.01) |
| *B23H 1/00* | (2006.01) |
| *B23P 15/02* | (2006.01) |
| *C22B 9/04* | (2006.01) |
| *C22B 9/20* | (2006.01) |
| *C22B 34/12* | (2006.01) |
| *C22C 14/00* | (2006.01) |

(52) U.S. Cl.
CPC . *C22C 14/00* (2013.01); *B21J 1/00* (2013.01); *B21J 1/02* (2013.01); *B21J 1/06* (2013.01); *B21J 5/002* (2013.01); *B21K 3/04* (2013.01); *B23H 1/00* (2013.01); *B23P 15/02* (2013.01); *C22B 9/04* (2013.01); *C22B 9/20* (2013.01); *C22B 34/1295* (2013.01); *C22F 1/183* (2013.01)
USPC ............................ 148/671; 148/421; 148/557

(58) Field of Classification Search
USPC ........... 148/95, 538, 539, 557, 559, 668–671, 148/707, 405, 421, 442; 420/417–421, 552
IPC ........ C22C 14/00; C22F 1/16,1/18; B21K 3/04; B23H 7/00; B23P 15/02
See application file for complete search history.

(56) References Cited

U.S. PATENT DOCUMENTS

| 5,190,603 A | 3/1993 | Nazmy et al. |
| 5,296,056 A * | 3/1994 | Jain et al. ...................... 148/421 |

(Continued)

FOREIGN PATENT DOCUMENTS

| EP | 0592189 A1 | 4/1994 | |
| EP | 0889143 A1 | 1/1999 | |
| WO | WO 2009/052792 A2 * | 4/2009 | ............. C22C 14/00 |

OTHER PUBLICATIONS

"Vacuum Arc Remelting," ASM Handbook, ASM International, 2008, pp. 132-138.*

(Continued)

*Primary Examiner* — Scott Kastler
*Assistant Examiner* — Vanessa Luk
(74) *Attorney, Agent, or Firm* — Bachman & LaPointe, P.C.

(57) ABSTRACT

A process for manufacturing a turbine engine component comprises the steps of: casting ingots made of a gamma TiAl material using a double vacuum arc remelting casting technique; subjecting the cast ingots to a hot isostatic pressing to close porosity; forming at least one pancake of the gamma TiAl material by isothermally forging the hot isostatic pressed ingots; sectioning each pancake into a plurality of blanks; heat treating the blanks to produce a desired microstructure and mechanical properties; and machining the blanks into finished turbine engine components. A system for performing the process is also disclosed.

7 Claims, 4 Drawing Sheets

(56) References Cited

U.S. PATENT DOCUMENTS

| | | | |
|---|---|---|---|
| 5,429,796 A * | 7/1995 | Larsen, Jr. | 420/590 |
| 5,431,754 A * | 7/1995 | Fujiwara et al. | 148/669 |
| 5,558,729 A * | 9/1996 | Kim et al. | 148/671 |
| 5,653,828 A * | 8/1997 | Zhao et al. | 148/671 |
| 2007/0107202 A1* | 5/2007 | Das | 29/527.7 |
| 2011/0189026 A1* | 8/2011 | Smarsly et al. | 416/241 R |

OTHER PUBLICATIONS

"Wrought Titanium and Titanium Alloys: Forging," ASM Handbook, ASM International, 1990, pp. 611-621.*

"Introduction to Bulk-Forming Processes," ASM Handbook, ASM International, 2005, pp. 3-10.*

S. L. Semiatin, "Bulk Forming of Intermetallic Alloys," Metalworking: Bulk Forming, vol. 14A, ASM Handbook, ASM International, 2005, originally pp. 354-365, 17 pages total in electronic format.*

Huang, Zhao-hui, "Isothermal forging of gamma-TiAl based alloys," Trans. Nonferrous Met. Soc. China, vol. 13, No. 6, Dec. 2003, pp. 1325-1328.*

Bates, Charles E. et al., "Quenching Media," vol. 4, Heat Treating, ASM Handbook (online version), ASM International, 2002.*

C. Wells; "Chapter 8 The Forging of Compressor and Turbine Blades"; In: G.W. Meetham: "The development of gas turbine materials", Dec. 31, 1981; Applied Science Publishers Ltd, London, XP-002664572; ISBN: 0853349525; pp. 207-208.

V.M. Imaev et al.; "Microstructure and Mechanical Properties of the Intermetallic Alloy Ti-45Al-6(Nb, Mo)-0.2B"; The Physics of Metals and Metallography, vol. 106, No. 6, Dec. 1, 2008, pp. 641-648, XP55013002, ISSN: 0031-918X, DOI: 10.1134/S0031918X08120132.

D. Clifton et al.; "Electrochemical Machining go Gamma Titanium Aluminide Intermetallics"; Journal of Materials Processing Technology, vol. 108, No. 3, Jan. 17, 2001; pp. 338-348, XP55013354; ISSN: 0924-0136, DOI: 10.1016/S0924-0135(00)00739-1.

* cited by examiner

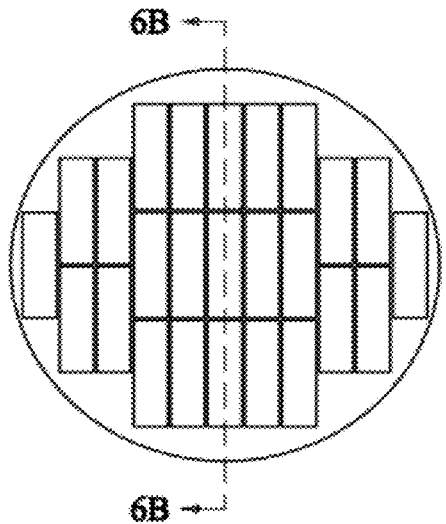
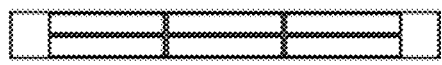
*FIG. 6B*
*FIG. 6A*
*FIG. 7*

PROCESS AND SYSTEM FOR FABRICATING GAMMA TIAL TURBINE ENGINE COMPONENTS

BACKGROUND

The present disclosure relates to a process for fabricating gamma TiAl turbine engine components, such as low pressure turbine blades.

FIG. 1 is a schematic diagram of a turbine blade 10 showing the root 12, the airfoil 14, and shroud 16 sections. As can be seen from the figure, the turbine blade 10 has a complex geometry. As a result, it cannot be easily fabricated. A number of process routes, incorporating both cast and wrought processes, have been used to fabricate low pressure turbine (LPT) gamma TiAl blades. For the cast process, investment mold casting is typically used to make oversized blade blanks which are then machined into final blades. The wrought process involves both extrusion and forging prior to machining.

Modern gas turbine engines operate at high speed and require tensile strength far exceeding the strength of cast gamma TiAl. Thus, cast process techniques are disadvantageous.

Recently, a new beta stabilized gamma TiAl alloy, called TNM, has attracted much attention. This alloy has a composition of Ti-43.5Al-4Nb-1Mo-0.2B (all in at %). This alloy solidifies through a beta solidification path which leads to moderate to mild chemical and microstructural segregations. The resultant microstructure consists mainly of lamellar colonies ($\alpha_2/\gamma$) with gamma and $\beta/B_2$ phases located primarily at the colony boundaries. Referring now to FIG. 2, there can be seen the tensile strength of TNM vs. an alloy having a composition of Ti-48 at % Al-2 at % Cr-2 at % Nb (known as 48-2-2) and an alloy having a composition of Ti-47 at % Al-2 at % Mn-2 at % Nb-0.8 vol % TiB2 (known as 47XD). Although the tensile strength of the TNM alloy as cast is significantly higher than other alloys used for these parts, it is still below the requirement for a LPT blade application.

Although cast gamma alloys fall short of the tensile strength required for some LPT blade applications, wrought gamma alloys, with proper heat treatments, produce a microstructure that yields a good balance of tensile strength and ductility at room temperature and creep resistance at elevated temperature. For the wrought process, an outer surface of double VAR cast ingots is lightly machined prior to insertion into stainless steel cans for extrusion. The extrusion takes place at a temperature over 2100 degrees Fahrenheit at an extrusion ratio of about 16:1. The extruded bar is then machined to remove the can. The yield of such an extrusion process is about 70%. The machined extruded bar is cut into smaller lengths as blade blanks and then isothermally forged into oversized blades in a molybdenum die at about 2000 degrees Fahrenheit. The yield of this process is about 70%. The oversized blades are heat treated using a two step process to develop a duplex microstructure consisting of globular gamma phase and ($\alpha_2/\gamma$) lamellar colonies with a small about of $\beta/B_2$ phase. The root, airfoil, and the shroud sections are machined from these oversized blades to produce the finished blades.

A typical microstructure for the cast-extruded-forged and heat treated material has a duplex microstructure consisting of 47 vol % gamma, 43 vol % of ($\alpha_2/\gamma$) lamellar colonies and 10 vol. % of $\beta/B_2$. The tensile properties were measured from the heat treated material at room temperature. The creep property was measured at 700 degrees Centigrade at a pressure of 36 ksi and yielded 1% plastic elongation for 150 hours. The cast-extruded-forged and heat treated material showed a yield stress of 126 ksi, a ultimate tensile stress of 151 ksi, and a 3.3% elongation. Both tensile and creep properties met the design goals for an LPT blade application.

The process steps outlined above however involve significant waste, resulting in unacceptable blade cost. There remains a need for a process which reduces the waste and results in a more acceptable blade cost.

SUMMARY

In accordance with the present disclosure a process for reducing the cost of producing turbine engine components, such as low pressure turbine blades, is provided.

The process for manufacturing a turbine engine component broadly comprises the steps of: casting ingots made of a gamma TiAl material using a double vacuum arc remelting casting technique; subjecting said cast ingots to a hot isostatic pressing to close porosity; forming at least one pancake of said gamma TiAl material by isothermally forging the hot isostatic pressed ingots; sectioning each said pancake into a plurality of blanks; heat treating said blanks to produce a desired microstructure and mechanical properties; and machining the blanks into finished turbine engine components.

A system for performing the above process broadly comprises means for casting ingots made of a gamma TiAl material using a double vacuum arc remelting casting technique; means for subjecting said cast ingots to a hot isostatic pressing to close porosity; means for forming at least one pancake of said gamma TiAl material by isothermally forging the hot isostatic pressed ingots; means for sectioning each said pancake into a plurality of blanks; means for heat treating said blanks to produce a desired microstructure and mechanical properties; and means for machining the blanks into finished turbine engine components.

Other details of the process and the system described herein are set forth in the following detailed description and the accompanying drawings wherein like reference numerals depict like elements.

BRIEF DESCRIPTION OF THE DRAWINGS

FIGS. 6A and 6B are schematic diagrams of the forged pancake showing cuts to form the pancake into rectangular blade blanks; and FIG. 7 is a photograph of a successful ECM machining of a wrought gamma blade blank into a blade.

DETAILED DESCRIPTION OF THE PREFERRED EMBODIMENT(S)

Figure 1:
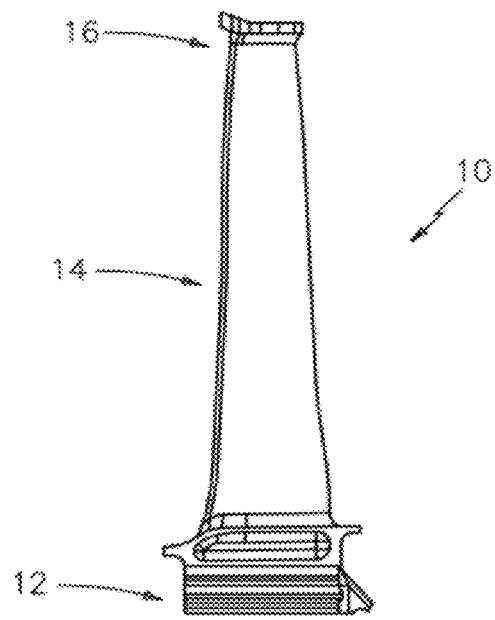
FIG. 1 is a schematic diagram of a turbine blade.
Figure 2:
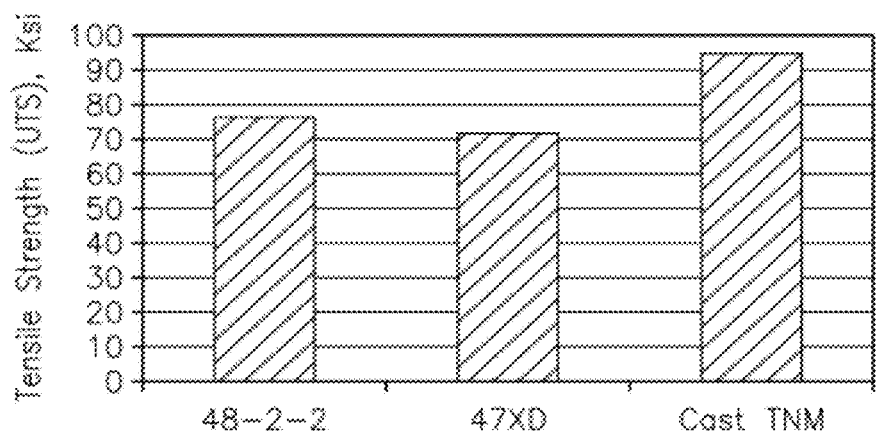
FIG. 2 is a bar graph showing the tensile strengths of cast 48-8-2, 47XD and TNM gamma alloys at room temperature.
Figure 3:
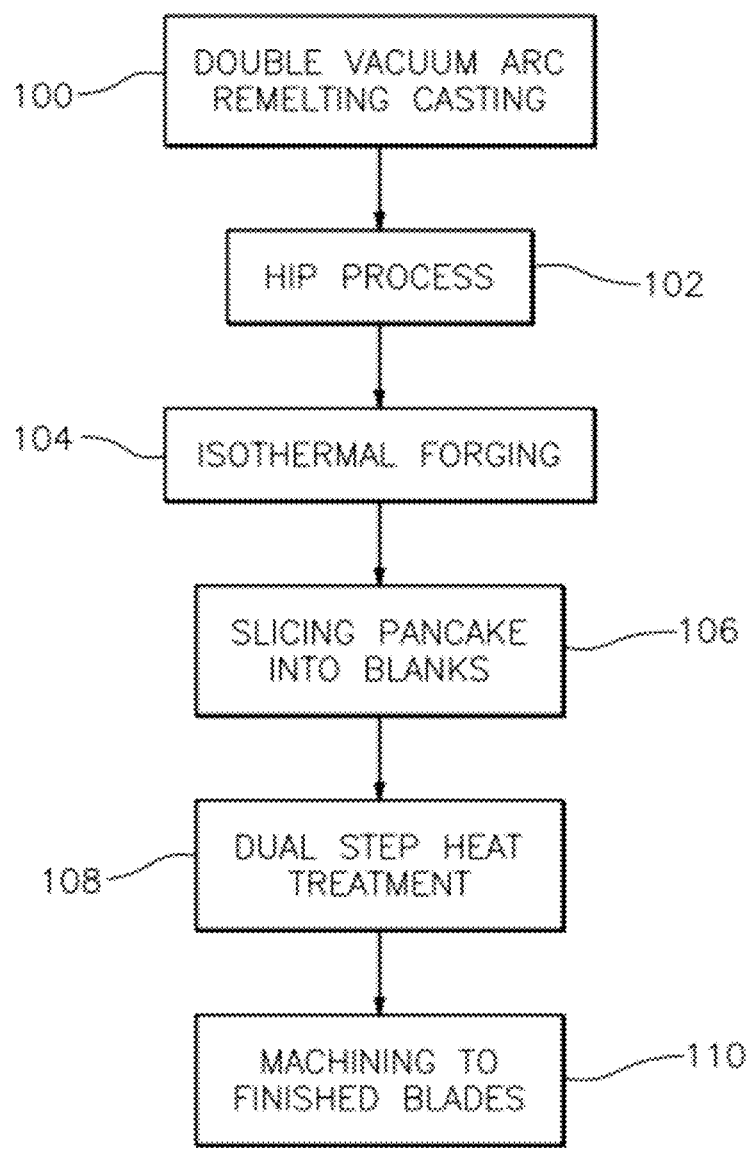
FIG. 3 is a flow chart showing the process disclosed herein.

In accordance with the present disclosure, there is described a lower cost process for fabricating turbine engine components, namely low pressure turbine gamma TiAl blades. The process is outlined in FIG. 3. It comprises performing double vacuum arc remelting (VAR) casting of ingots in step 100, performing a HIP process on the ingots in step 102, isothermally forging the HIPped ingots into pancakes in step 104, slicing or sectioning the pancakes into a plurality of blade blanks in step 108, heat treating the blade blanks to produce a desired microstructure in step 108 and electrochemical machining of the heat treated blade blanks into finished blades in step 110.

Double VAR cast titanium alloy ingots formed from a titanium alloy such as Ti-43.5Al-4NB-1Mo-0.2B (all in at %) may be used as a starting material. By using such a material as the starting material, it is possible to eliminate an expensive and wasteful extrusion process from the blade fabrication process. While a specific titanium alloy has been mentioned hereinabove, it should be recognized that other titanium alloys may be used.

The Double VAR casting step 100 may be performed using any suitable Double VAR casting system known in the art.

Following the casting of the ingots, a HIP step 102 is performed at a temperature in the range of 2100° F. to 2240° F. for a time in the range of six hours to eight hours at a pressure in the range of from 20 ksi to 35 ksi. The HIP step 102 is performed to close porosity in the double VAR ingots. The HIP step 102 may be performed using any suitable HIPping system known in the art.

The HIP'd ingots were then isothermally forged in step 104 at a temperature in the range of 1850 to 2200 degrees Fahrenheit with different strain rates ranging from 0.015/min to 0.6/min into pancakes. For demonstration purposes, a rectangular section (3.5"×2.5"×2") was cut from a HIP'd ingot (9" diameter×2" high) and was isothermally forged at 2000 degrees Fahrenheit at a strain rate of 0.015/min to a rectangular pancake having dimensions, 5.6"×4.6"×0.7", with a 65% reduction. The isothermal forging step 104 may be performed by any suitable system known in the art.

The forged pancake may then be sliced in step 106 into a plurality of rectangular blade blanks, as shown in FIGS. 6A and 6B, preferably by EDM machining. Any suitable EDM machine may be used to perform this step. Alternatively, water jet machining may be used.

Figure 4:
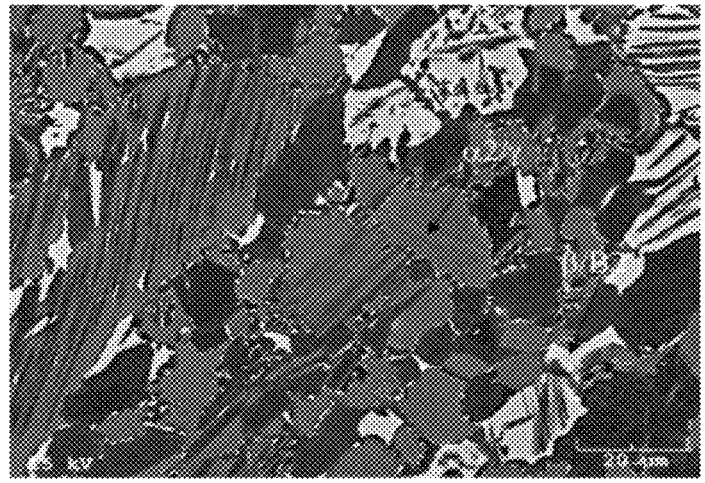
FIG. 4 is a scanning electron micrograph showing the microstructure of a heat treated cast-HIP'd-forged TNM alloy.

Thereafter, in step 108, the blanks sectioned from the pancake were heat treated in suitable furnace using a first heat treatment step at a temperature in the range of from 2240° F. to 2300° F. in the (alpha+gamma) phase field for a time period in the range of from one hour to two hours. After the first heat treatment is completed, the blanks are cooled to room temperature. An air cooling technique may be used to cool the blanks. Thereafter, a second heat treatment step is performed at a temperature in the range of from 1550° F. to 1700° F. for a time period in the range of from four hours to six hours in air. Thereafter, the blanks are furnace cooled to room temperature. The heat treatment described about was found to yields a duplex microstructure which may consist of 49 vol % gamma, 39 vol % ($\alpha_2/\gamma$) lamellar colonies with 12 vol % of $\beta/B_2$ as shown in FIG. 4. The microstructure developed in both heat treated cast-Hip-forged and cast-extruded forged gamma TiAl alloys are similar except for differences in volume fractions of individual phases. Heat treatment parameters can be modified to yield microstructure that satisfies design criteria for other applications.

Tensile properties were determined from the heat treated cast-HIP'd-forged pancake at room temperature. The heat treated cast-hip'd-forged TNM gamma alloy at room temperature had a yield stress of 102 ksi, an ultimate tensile strength of 122 ksi, and an elongation of 1.8%. Tensile strength at room temperature for the process outlined hereinabove is lower than for the cast-extruded-forged process described above. This may be due to the development of texture in extruded material. This may also be due to cooling from a solutionizing temperature. In addition, the creep behavior of the heat treated cast-HIP'd forged pancake at 700 degrees Centigrade and a pressure of 36 ksi was determined to be similar to the heat treated cast-extruded-forged material described above. Although the tensile properties are lower, they are within the design limits for fabricating lower pressure turbine blades. As for the creep behavior, it too is within the design limits for this part.

Figure 5:
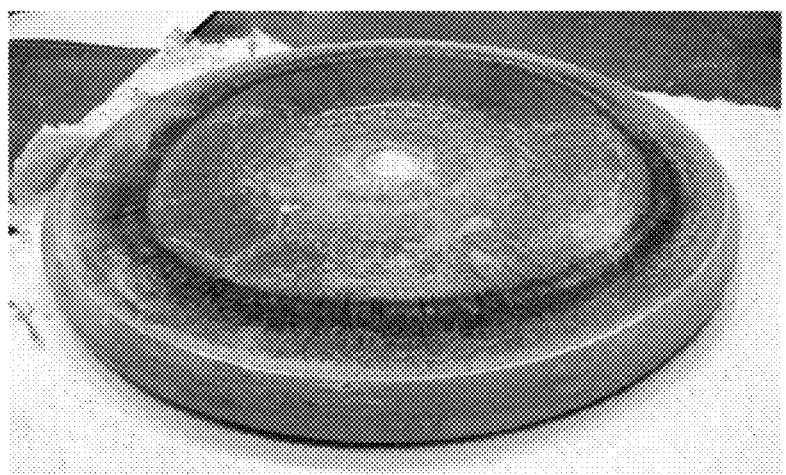
FIG. 5 is a photograph of an isothermal forged hip'd double VAR cast TNM ingot formed into a pancake.

Isothermal forging of a HIP'd double VAR Cast TiAl alloy ingot of 7.25" dia.×13" long at a temperature of 2000 degrees Fahrenheit and a strain rate of 0.05/min to a reduction of approximately 83% yields a pancake of about 18.5" dia.×2.2" thick as shown in FIG. 5.

The blade blanks are then ECM machined to finished blades in step 110. The finished blades may have the configuration shown in FIG. 7. Alternately, conventional machining may be used instead of ECM machining. For a large volume of parts ECM machining may be economical.

An example of a successful ECM machining of a gamma TiAl into a simple small blade is shown in FIG. 7. It is possible to obtain 50 or more finished blades from a single small forged pancake.

The major cost reduction steps provided by the process described herein are as follows:

(1) The elimination of wasteful and costly extrusion process will bring down the cost of the blade;

(2) In a wrought process route, isothermal close-die forging of individual extruded blade blanks into oversized blades will be very costly. Alternatively, several blade blanks can be close-die forged in specially built molybdenum dies in order to lower the cost. But still the process is much complicated and more expensive than simple pancake forging followed by EDM machining of the blade blanks;

(3) ECM machining has been demonstrated for simple gamma TiAl blade geometry and the process will significantly lower the cost of machining of blades compared to labor intensive manual machining used for the wrought process; and (4) The HIP step has been added with negligible cost impact to total production cost of a finished blade.

It is apparent that there has been provided in accordance with the instant disclosure a process for fabricating gamma TiAl turbine engine components. While the process has been described in the context of a specific embodiment thereof, other unforeseen alternatives, modifications, or variations may become apparent to those skilled in the art having read the foregoing description. Accordingly, it is intended to embrace those alternatives, modifications, and variations as fall within the broad scope of the appended claims.

What is claimed is:

1. A process for manufacturing a turbine engine component comprising the steps of:
   casting ingots made of a gamma TiAl material using a double vacuum arc remelting casting technique;
   subjecting said cast ingots to a hot isostatic pressing to close porosity;
   forming at least one pancake of said gamma TiAl material by isothermally forging the hot isostatic pressed ingots;
   performing said isothermal forging step at a temperature in the range of from 1850° F. to 2200° F. using a strain rate in the range of from 0.015/min to 0.6/min;
   sectioning each said pancake into a plurality of blanks;
   heat treating said blanks to produce a desired microstructure and mechanical properties, wherein said heat treating step comprises subjecting each said blank to a first heat treatment at a temperature in the range of from 2200° F. to 2300° F. for a time period in the range of from one hour to two hours, air cooling each said blank, and then subjecting each said blank to a second heat treatment at a temperature in the range of from 1550° F. to 1700° F. for a time period in the range of from four to six hours and furnace cooling each said blank to room temperature; and machining the blanks into finished turbine engine components.

2. The process of claim 1 wherein said casting step comprises casting ingots of a gamma TiAl alloy having a composition of 43.5 at % Al, 4.0 at % Nb, 1.0 at % Mo, 0.2 at % B, and the balance Ti.

3. The process of claim 1 wherein said hot isostatic pressing step is performed at a temperature in the range of from 2100° F. to 2240° F. for a time period in the range of from six to eight hours at a pressure in the range of from 20 ksi to 35 ksi.

4. The process of claim 1, wherein said sectioning step is performed by one of electro-discharge (EDM) machining and waterjet machining.

5. The process of claim 1, wherein said heat treating step comprises heating each said blank to form a duplex microstructure consisting of gamma, ($\alpha_2/\gamma$) lamellar colonies with $\beta/B_2$ phases.

6. The process of claim 1, wherein said heat treating step comprises heating each said blank to form a duplex microstructure consisting of 49 vol % gamma, 39 vol % ($\alpha_2/\gamma$) lamellar colonies with 12 vol % of $\beta/B_2$ phases.

7. The process of claim 1, wherein said machining step comprises using ECM machining of the blanks to form finished turbine blades.

* * * * *